Patented July 17, 1928.

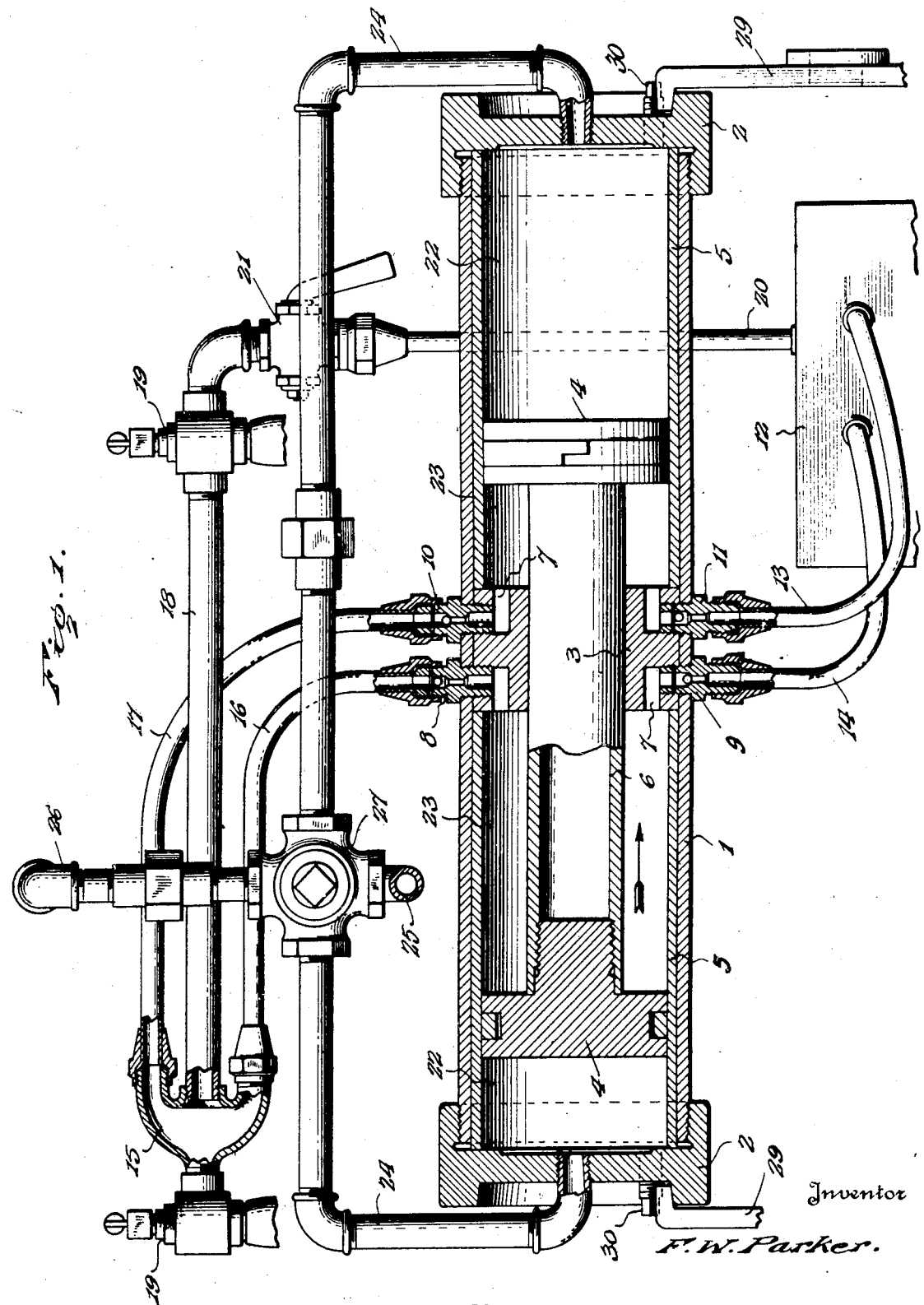

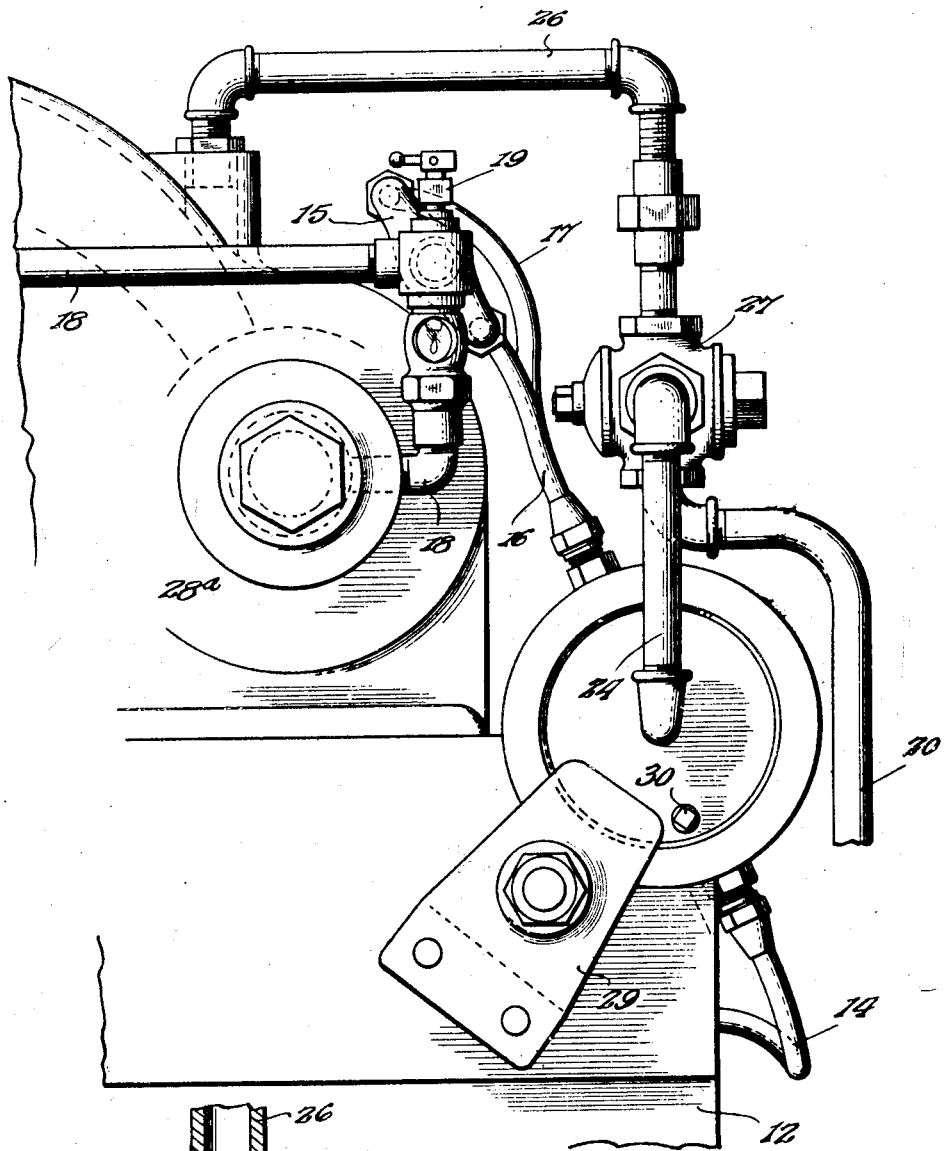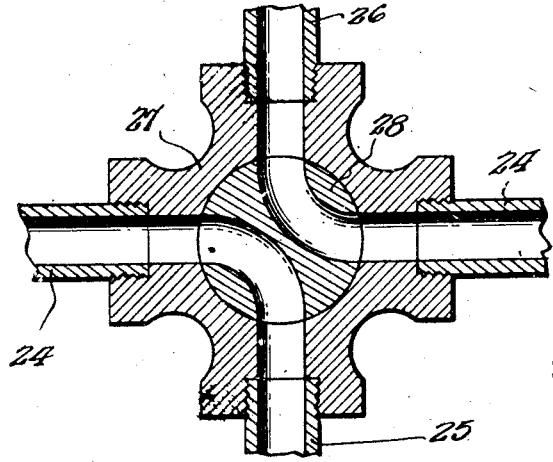

1,677,595

UNITED STATES PATENT OFFICE.

FRANK WESLEY PARKER, OF BOISE, IDAHO.

SUPERPRESSURE LUBRICATOR.

Application filed March 26, 1927. Serial No. 178,746.

The object of this invention is the provision of means whereby a lubricant is positively supplied to bearings and moving parts of machinery at a pressure which is constantly maintained at a predetermined ratio in excess of the pressure existing within the mechanism, regardless of any fluctuations in the internal pressure, and to effect the same without the expenditure of any appreciable amount of energy or the provision of a complex organized structure.

The invention provides a unit which may be applied to compressors, rotary reciprocating or turbine pumps, water motors and analogous machinery having bearings which are subjected to internal pressure and which are required to be lubricated to maintain their efficiency and to minimize the wear of vital parts.

The invention contemplates a cylinder divided to provide similar chambers, a valved induction and a valved eduction pipe connected with the inner end of each of the chambers, pistons operable in the chambers and connected for simultaneous movement, a pressure supplying pipe connected with the outer end of the said chambers and having a four way valve in its length whereby to vent one of the chambers while the other chamber is under pressure, and a lubricant distributing pipe connected with the said eduction pipes and with the parts to be lubricated and having a valved return to admit of quick adjustment of the lubricator when setting the same at given periods.

The invention furthermore provides a mechanism of the character aforesaid which is efficient, positive in action, simple in design and flexible in application so that it can be easily connected in a practical manner, to those various types of machines requiring to be lubricated under conditions where the lubricant must be forced to the bearings or other parts, under a pressure sufficient to overcome the resistance offered by the internal pressure of the machine.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a diagrammatic view of a super-pressure lubricator embodying the invention, parts being in section to show more clearly the cooperative relation of the working parts.

Figure 2 is an end view of the super-pressure lubricator showing it applied to a machine having bearings exposed to internal pressure, a portion only of the machine being illustrated, sufficient to show the application of the invention.

Figure 3 is a sectional view of a four-way valve for controlling the working pressure to the operative parts of the super-pressure lubricator.

Corresponding and like parts are referred to in the following description and designated in the several views of the drawings by like reference characters.

The body of the lubricator comprises a cylinder 1 to the ends of which are fitted heads 2, preferably by means of a screw thread connection. A partition 3 located centrally within the cylinder 1 divides the same into chambers, in which are located pistons 4. Tubes 5 are fitted snugly within opposite end portions of the cylinder 1 and receive the partition 3 between their inner ends. The outer ends of the tubes 5 project slightly beyond the ends of the cylinder 1 to receive the confining pressure exerted by the heads 2 so as to clamp the partition 3 between the inner ends of the tubes, and thereby prevent any possible displacement of the partition after the parts have been properly assembled. The pistons 4 fit snugly within the tubes 5. A rod 6 connects the pistons 4 and obtains a snug fit within the partition 3. This rod may be of any formation and size depending upon the effective area of the inner face of the pistons. It is observed that the outer face of the pistons is unobstructed and presents a maximum area to receive the full pressure of the working force. The inner face of the pistons is restricted by reason of the connection 6, hence the developed pressure is intensified and is utilized to supply the lubricant to the parts to be lubricated by a pressure which is in excess of that exerted upon the outer face of the pistons, and which may be derived from the pressure of the machine to be lubricated or from any other source. As a result of this arrangement the lubricant is forced into the bearings or other parts of the machine to be lubricated under a pressure which is constantly maintained at a fixed ratio higher than the pressure existing within the machine, regardless of fluctuations in such internal pressure. Similar ports 7 are formed within opposite portions of the partition 3 and valves are associated with these ports for controlling the flow of the lubricant. The valves 8, 9, 10 and 11 are coupled to the respective ports 7 and coact therewith and may be of any make or type best adapted for the particular work for which the lubricator is designed. The numeral 12 designates a reservoir or tank for holding a quantity of lubricant. A pipe 13 connects the valve 11 with the reservoir 12. A pipe 14 connects the valve 9 with the reservoir 12. These pipes 13 and 14 by reason of their function in supplying the lubricant to the cylinder may be designated as induction pipes. A header or manifold 15 is connected to the valves 8 and 10 by means of pipes 16 and 17, which by reason of their operation may be referred to as eduction pipes, since they convey the lubricant from the cylinder 1 to the parts to be lubricated. This header or manifold 15 provides a junction or common point of entry into the pressure service line for delivery pipes 16 and 17 as they alternately operate, this header serving the further purpose of a central distributing point from which the lubricant may be conveyed, at uniform pressure, in opposite directions, or in one of either directions as conditions may require. Distributing pipes 18 are coupled to the header or manifold and convey the lubricant to the bearings or other parts to be lubricated, in this instance through sight feeders 19. It is observed that the manifold or header 15 may be located at any determinate point in the length of the distributing pipe 18. A return pipe 20 connects the distributing pipe 18 with the reservoir or tank 12 and provides for a quick return of the lubricant from an end portion of the cylinder to the reservoir, thereby providing a means for controlling the location of the pistons 4 within the cylinder 1, whereby either of the pistons can be quickly brought to an extreme position in its travel, thus making certain that a full piston stroke is available at the commencement of a period of operation. A cock 21 controls the communication between the distributing pipe 18 and the return pipe 20.

It is observed that the spaces in the ends of the cylinder 1 upon opposite sides of the partition 3 are divided by the respective pistons 4 into chambers 22 and 23. The chambers 22 are comprised between the respective heads 2 of the cylinder and the pistons 4, and receive the pressure whereby the lubricator is automatically operated when timed and set. The chambers 23 are comprised between the partition 3 and the respective pistons 4, and receive the lubricant to be supplied to the parts to be lubricated in the operation of the device. The several ports open into the lubricant chambers 23. Pressure supplying pipes 24 connect with the respective heads 2. The numeral 25 designates an exhaust pipe and 26 a supply pipe deriving pressure, in this instance, from the machine to be lubricated and which may consist of an air compressor, a turbine pump, a water motor or the like. A four-way valve 27 is located at the juncture of the several pipes 24, 25, and 26, and its plug 28 may be turned to direct the pressure to either one of the chambers 22 and to relieve the pressure from the opposite chamber 22 when the device is in action.

The numeral 28$^a$ designates generally the machine to be lubricated and the pipe 18 for distributing the lubricant extends to the bearings and parts to be lubricated and may be provided at determinate points with sight feeders 19 of any make or design. The super-pressure lubricator may be attached to the machine 28$^a$ in any determinate way and, as indicated in Figures 1 and 2, clamps 29 are provided, and engage the beveled walls of recesses formed in the heads 2 of the cylinder. Drain openings are formed in the cylinder heads 2 and are closed by means of plugs 30. The oil reservoir 12 may be formed in the base of the machine or provided in any determinate way. It is observed that the lubricator may be marketed as a unit and designed for special machines, and fitted thereto in any preferred way. The pressure for operating the lubricator is ordinarily derived from the machine to be lubricated and may be taken from the feed or the delivery side according to the nature of the machine. When the lubricator is properly installed pressure is supplied to the lubricator by means of the pipes 26 and 24, and is controlled by means of the four-way valve 27. The plug 28 of the four way valve 27 may be adjusted to direct the pressure to one of the chambers 22 and at the same time exhaust the pressure from the opposite chamber 22. Assuming that the four-way valve is adjusted to supply the pressure to the left hand chamber 22 the right hand chamber 22 is at the same time in communication with the exhaust 25. The pistons traveling to the right, as indicated by the arrow in Figure 1, causes a supply of lubricant to be drawn from the reservoir 12 into the right hand chamber 23 in which a suction is created, the valve 11 being open and the valve 10 closed. At the same time the content of the left hand lubricant chamber 23 is expelled therefrom, the valve 9 being closed and the valve 8 open. When the pistons reach the limit of their movement to the right, the chamber 23 to the right of the partition 3 is filled with lubricant and the chamber 23 to the left of the partition 3 is empty. The four-way valve 27 is now reversed and in consequence pressure is supplied to the right hand chamber 22, and the left hand chamber 22 is open to the exhaust. As the pistons travel to the left the lubricant contained in the right hand chamber 23 is expelled therefrom, and passes through the eduction pipe 17 into the header or manifold 15, thence into the distributing pipe 18 to the parts to be lubricated. During the movement of the pistons to the left, lubricant is drawn from the reservoir 12 into the left hand chamber 23 to be forced therefrom in the next movement of the pistons to the right and directed by the eduction pipe 16 into the header 15 and distributing pipe 18. The pressure for operating the lubricator being derived from the machine to be lubricated, it follows that the pressure exerted upon the outer face of the pistons 4 corresponds with the pressure of the machine, and necessarily fluctuates with such pressure. The inner face of the pistons 4 being of a restricted area, by reason of the connection 6, necessarily intensifies the pressure exerted for expelling the lubricant and supplying the same to the parts to be lubricated, hence the lubricant is forced into the bearings or parts to be lubricated by a pressure, which is constantly maintained at a fixed ratio higher than the pressure existing within the machine, regardless of fluctuations in such internal pressure.

The lubricator is constructed with a view to require approximately several hours for the pistons to travel the full length of their stroke in one direction and this represents a period of operation. When setting the lubricator at the beginning of a period of operation it is desirable to have the pistons at the limit of their stroke in one direction. This is effected by opening the relief cock 21, and adjusting the four-way valve 27 so that pressure is supplied to an end of the cylinder. The lubricant, having a free passage through one of the eduction pipes 16 or 17, the distributing pipe 18 and the return pipe 20, flows rapidly back into the reservoir 12, and upon closing the cock 21 and reversing the four-way valve 27 the pressure is admitted into the opposite end of the cylinder 1, thereby assuring the pistons being in position to travel a full stroke so as to cover a period of operation for which the lubricator is designed.

A super-pressure lubricator, such as herein outlined, is a desideratum, since it admits of a film of oil being constantly forced inwardly along a bearing, thereby preventing corrosive fluids, or gases, from entering and attacking the bearings. This is an important factor in ammonia compressors. It also prevents obnoxious and poisonous gases from escaping around the bearings, and stuffing box of refrigerator plants. An embodiment of the invention requires no change in the design, whether adapted to be actuated by pressure of liquid, or gas, such as water, air, steam or other medium, and the source of pressure is immaterial, whether derived from the machine to be lubricated or other source. The lubricator may be incorporated into the design of the machine to be lubricated, or attached thereto, or located remote therefrom and connected thereto by piping.

It is further noted that the construction of the device is such that it is susceptible of a wide field of application and utility, alike suitable for use where actuating pressure originates from within or without the machine or parts to be lubricated and that it furthermore may be employed to compel a static head when used as an actuating force, to deliver a pressure greater than itself, as in the case where a hydrostatic head is used for raising water to a higher level, and again where this same static head as an actuating force can be made to deliver a pressure greater than itself, against itself, as in the case of spraying cold water into a condensing cylinder. In such adaptation of the invention the four-way valve would be automatically operated.

It is observed that the cylinder 1 is of uniform bore throughout its length and receives the partition 3 which is snugly fitted therein. The ports 7 of the partition register with openings in the sides of the cylinder through which the valves 8, 9, 10 and 11 pass, thereby forming positive connecting means between the cylinder and partition and fixing the position of the latter.

Having thus described the invention, I claim:

1. A lubricator of the character specified comprising a cylinder, a partition dividing the cylinder into chambers, tubes snugly fitted within the chambers and confining the partition between their inner ends, pistons in the chambers, means connecting the pistons and passing through the said partition, means for supplying pressure to opposite ends of the cylinder, induction and eduction pipes connected with the inner ends of the said chambers, valves for controlling the flow through the induction and the eduction pipes, and a distributing pipe in communication with the said eduction pipes.

2. A lubricator comprising a uniformly bored cylinder formed in opposite sides with openings, a separate partition dividing the cylinder into chambers, and having ports formed therein in registration with the openings in the sides of the cylinder, connected pistons operating in the said chambers and having the connection passing through said partition, means for supplying pressure to the outer ends of the chambers, valves fitted in the registering openings of the cylinder and partition, and providing positive connecting means for fixing the position of said partition, induction and eduction pipes connected with the respective valves, and a distributing pipe in communication with the eduction pipes.

3. A lubricator comprising a cylinder divided to provide chambers, connected pistons in the chambers, means for supplying pressure to the outer ends of the chambers, valved induction and eduction pipes connected with the inner ends of the chambers, a distributing pipe in communication with the eduction pipes, a return pipe connected with said distributing pipe and a manually operable cock for controlling the communication between the distributing and the return pipes, whereby to provide for a quick movement of the pistons in the chambers of the cylinder to a determinate position.

4. A lubricator comprising chambers, pistons therein connected for synchronous movement, means for supplying pressure to corresponding ends of the chambers, valved induction and eduction pipes connected with the opposite ends of the chambers, a manifold having the eduction pipes connected thereto, a distributing pipe in communication with the manifold, a return pipe connected with the distributing pipe and a manually operable cock for controlling the communication between the distributing and the return pipes, whereby to provide for a quick movement of the pistons in the chambers of the cylinder to a determinate position.

5. A lubricator comprising a cylinder, heads closing the ends of the cylinder, a partition centrally disposed within the cylinder and dividing the same into like chambers, said partition having a plurality of ports formed therein, tubes snugly fitted within opposite end portions of the cylinder upon opposite sides of the partition, and clamped between said partition and the heads of the cylinder, pistons in the tubes, means connecting the pistons and passing through the said partition, pressure supplying pipes connected with the cylinder heads, supply and exhaust pipes, a four-way valve at the juncture of the several pipes, valves fitted to the cylinder and partition and in communication with the respective parts of the latter, induction and eduction pipes connected with the respective valves, a manifold having the eduction pipes connected thereto, a lubricant distributing pipe connected with the manifold, a return pipe connected with the distributing pipe, and a cock for controlling the communication between the distributing and return pipes.

6. A super-pressure device of the character and for the purpose herein stated embodying a cylinder, heads closing the ends thereof, a plural ported partition centrally disposed therein, tubes snugly fitted within opposite end portions of the cylinder and clamped between the heads thereof and the said partition, pistons within the tubes, means connecting the pistons and operating through the partition, valves fitted to the cylinder and partition and in communication with the respective ports of the latter, induction and eduction pipes connected to the respective valves, a distributing pipe in communication with the eduction pipes, pressure supplying pipes connected with the cylinder heads, and a four-way valve having the pressure supplying pipes connected thereto, and provided with an exhaust and a pressure supply.

In testimony whereof I affix my signature.

FRANK WESLEY PARKER. [L. S.]